May 17, 1966 W. H. LAHTI 3,251,953
ELECTRO-ACOUSTIC TRANSDUCER
Filed May 11, 1962
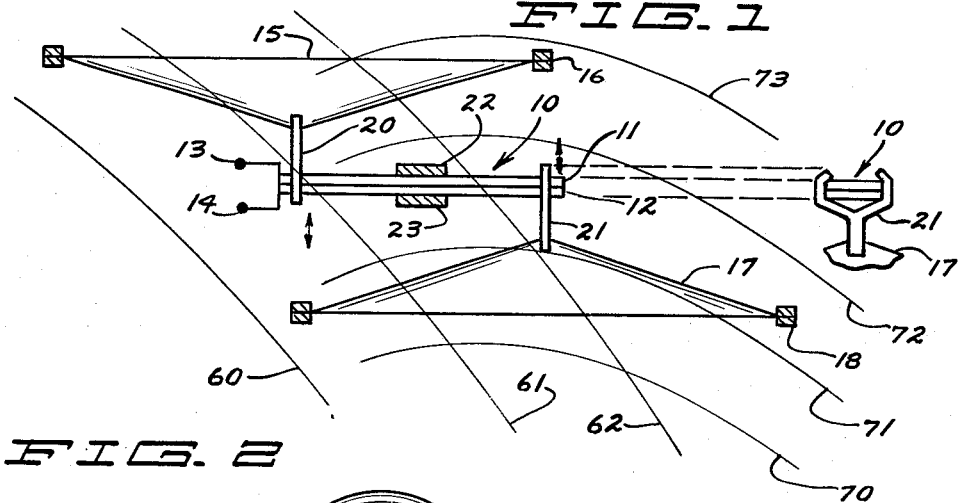
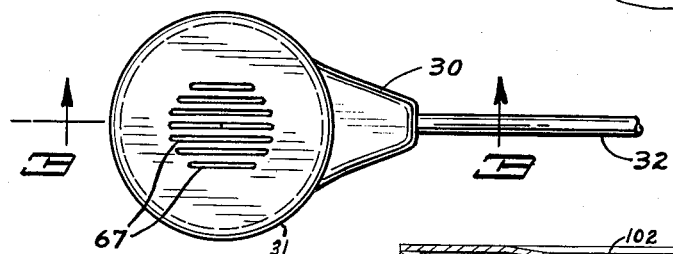
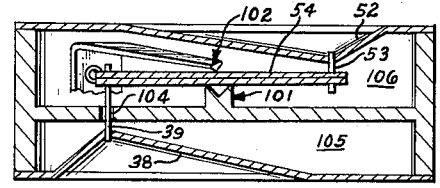
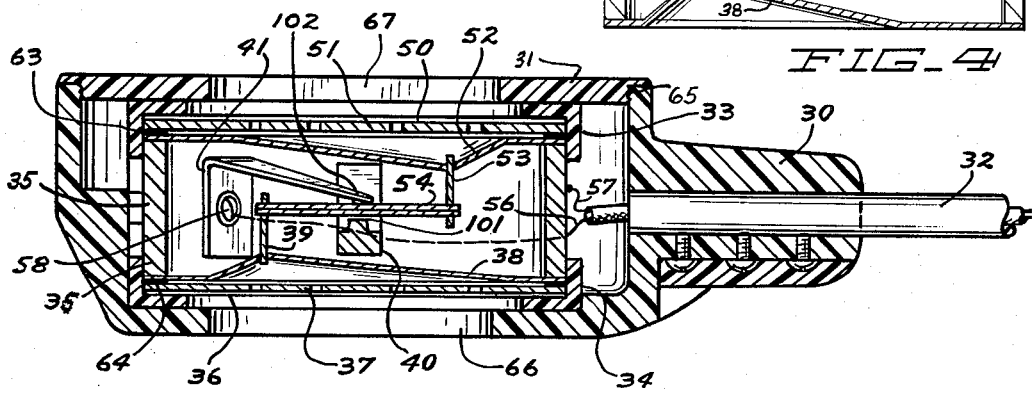
INVENTOR.
WILLIAM H. LAHTI
BY
Carlsen & Carlsen
ATTORNEYS

United States Patent Office 3,251,953
Patented May 17, 1966

3,251,953
ELECTRO-ACOUSTIC TRANSDUCER
William H. Lahti, Columbia Heights, Minn., assignor, by mesne assignments, to The Telex Corporation, Tulsa, Okla., a corporation of Delaware
Filed May 11, 1962, Ser. No. 194,010
12 Claims. (Cl. 179—110)

This invention relates generally to transducers of the type which are useful for converting compressional wave energy into an electrical signal and is more particularly directed to devices of this class which discriminate between sources of compressional wave energy located a small distance from the transducer and those sources are located at a relatively large distance from the transducer.

The prior art has recognized the problems associated with effectively and efficiently converting a compressional wave signal, such as that of the human voice, to an electrical signal for transmission to remote locations or other purposes in that any amount of ambient noise, which may be defined as an undesirable signal, is ordinarily converted to an electrical signal along with the desired signal so as to reduce the overall usefulness of the transducer.

It has also been proposed to mount a pair of microphones back to back and by the use of suitable electrical networks, cancel, electrically, the outputs when in phase. Another similar example of the combining of the outputs of a pair of diaphragms to cancel out the in-phase signals which represent distant noises used a mechanical linkage arrangement operating upon a single electro-mechanical translating element. The efficiency of some of such arrangements has left something to be desired. Further, the cost of producing such devices has proven to be relatively high.

In the present invention, the cost and size have been substantially reduced while the efficiency and output of the unit have been increased. In utilizing the combination of a pair of back-to-back diaphragm members with a center clamped bi-morph piezo-electric member, there has been provided a new and useful sound-distance discriminating microphone which does not require the use of complicated electrical networks or sound energy absorbing materials.

One application in which my invention is useful is concerned with the use of a transducer in the center of a large area, such as a sports arena, for discrimination between a speaker's voice and the usual background noise. Use in other environments is possible, including a hydrophone installation below the surface of a body of water.

It is therefore an object of this invention to provide a new and useful distance discriminating transducer.

It is another object of my invention to provide a microphone for use in areas of high ambient noise level which will provide a high signal to noise ratio output.

These and other more detailed and specific objects will be disclosed in the course of the following specification, reference being had to the accompanying drawings, in which FIG. 1 is a diagrammatic pictorial representation of a transducer embodying the principles of my invention;

FIG. 2 is a front view of a completed microphone assembly containing the transducer which is the subject of this invention;

FIG. 3 is a cross sectional drawing taken along the center line 3—3 on FIG. 2.

FIG. 4 is a cross sectional view showing the microphone cartridge portion of a further embodiment of my invention.

Referring now to FIG. 1 there is shown a pair of diaphragm members 15 and 17, each of which is mounted in a mounting means 16 and 18 respectively such that the diaphragm members are fixed and have a back-to-back relationship and the output members, 20 and 21 of each are free to move in an upward and downward direction as indicated by the arrows. A piezo-electric element 10, which may take the form of a bi-morph crystal made up of elements 11 and 12, is rigidly held in relation to diaphragm members 15 and 17 by mounting means 22 and 23. Member 10 may be of any material which exhibits the well known piezo-electric characteristic of providing an electrical output in response to mechanical deformations thereof. A pair of output terminals 13 and 14 are connected to the top and lower faces of member 10. The left end of member 10 is connected to the output of diaphragm 15 through connecting means 20. The right end of member 10 is connected to the output of diaphragm 17 through member 21. An end view of member 10, connecting means 21 and diaphragm 17 is included at the right of FIG. 1.

A plurality of segments of circular lines, 60, 61 and 62 represent compressional waves emanating from a distance source of signal and are necessarily of large radius. A further plurality of lines, 70, 71 and 72 and 73 likewise represent compressional waves but which emanate from a nearby source of signal and thus are of necessarily small radius.

The well known characteristic of the piezo-electric member 10 is such that for deformations in a particular direction, an electrical output signal appears across the major, or top and bottom faces, which is of one polarity for deformations in one direction and of another polarity for deformations in a second direction. The magnitude of the electrical signals generated by such deformations is dependent upon the amount of deformation so that for large deformations a large output signal results, and for small deformations a small output signal results, again dependent upon the direction of deformations. By securely mounting, or clamping the piezo-electric member 10, substantially at its mid point, and applying forces at both ends, it may be seen that the application of such a force with the resultant deformation at either end will result in an output of one polarity or another dependent upon the direction of deformation. In the embodiment of FIG. 1, deformation of either end of piezo-electric element 10 in the same direction, for example upwardly, results in an output signal of one polarity. Likewise deformation in a downward direction of either end of the element 10 results in output signal of the opposite polarity. In the case where one end is moved in one direction and the other end is moved in the opposite direction a signal proportional to the difference between the forces, or deformations, is produced due to a cancellation of a signal of one polarity by the signal of the other polarity.

When the compressional waves, as represented by lines 60, 61 and 62 impinge on diaphragms 15 and 17 from a distant source of signal, they are substantially in phase and being of substantially equal energy content at each of the diaphragm members, the motion of each of the diaphragm members will be simultaneous and of substantially the same amount. This is transmitted to both ends of piezo-electric member 10 through connecting members 20 and 21 and the resultant output signal at terminals 13 and 14 is substantially zero. On the other hand, the compressional waves represented by lines 70, 71, 72 and 73 impinge on diaphragm 17 with greater amplitude than on diaphragm 15 and the relative displacements of diaphragms 17 and 15 result in a substantial output appearing at output terminals 13 and 14.

FIG. 2 and FIG. 3, which is a cross sectional view taken along center line 3—3 of FIG. 2, illustrate the constructional features of one embodiment of my invention. Like reference numerals are applied to like elements. A housing assembly includes a lower portion 30 having a thread 65 provided on the inside periphery of an opening for engagement with a cover member 31. Cover member 31 and housing 30 are provided with substantially identical slots 67 and 66 for the admission of compressional energy to the interior of the housing assembly. A cable 32 containing appropriate conductors 57 and 56 is attached to housing member 30 and is provided for connection of the output of the microphone to suitable output utilization apparatus, for example, the pre-amplifier of a tape recorder.

A microphone cartridge assembly is securely positioned within the interior of the housing assembly and held in place by a pair of resilient mounting rings 33 and 34 which are dimensioned to fit the exterior dimensions of a microphone cartridge and appropriate recesses provided on the interior of the housing assembly. The threaded coupling 65 between cover 31 and housing member 30 serves to provide a unitary structure in which the outward facing areas of the top and bottom of the microphone cartridge are exposed to the exterior of the housing assembly only through the top and bottom openings, 67 and 66 respectively.

The microphone cartridge assembly which may be of metal is comprised of a frame member 35 which is of substantially cylindrical shape with a rectangular shaped cross member 40 extending across the diameter of the interior so as to provide one-half of the support, or clamping member for piezo-electric element 54. This region 40, may comprise the electrical connection to one side of the element 54. A pair of diaphragm members 52 and 38 are bonded to the top and bottom edges of the frame member 35. Diaphragms 38 and 52 are shown as having an offset conical shape wherein the apex of the cone is displaced from the center of the diaphragm. Diaphragms 52 and 38 may be constructed of material having suitable stiffness and mass characteristics commensurate with the particular application. Washers 63 and 64, loading plates 51 and 37, and acoustic resistance elements 50 and 36 are bonded together at the output peripheries of diaphragms 52 and 38 respectively. Piezoelectric member 54 is held substantially at its mid point through the coaction of mounting 40 and spring biasing means 41, which is attached to frame member 35 by use of suitable fastening means, such as eyelet 58. Member 41 is insulated from frame member 35 by suitable means (not shown) and eyelet 58 is filled with solder or other suitable material to provide a seal impervious to fluid. It is preferable to seal the interior of the portion of the assembly bounded by diaphragm members 52 and 38 and frame 35. It is, as shown in FIG. 4, possible to divide the chamber into two halves 105 and 106 by suitable dividing means 103 having an aperture 104 so that in effect, each of the diaphragms would have a separate chamber not in communication with the other diaphragm. Under certain conditions, it may be desirable to allow fluid communication between two such chambers through the intermediary of an acoustic impedance. Aperture 104 may be suitably dimensioned with respect to coupling means 39, shown extending therethrough, to provide sufficient clearance to effect an acoustic impedance. The right end of piezo-electric member 54 is connected to the output of diaphragm 52 through coupling means 53 and the left end is connected to the output of diaphragm 38 through coupling means 39. The coupling means may be of compliant nature to gain certain acoustic responses.

Piezo-electric member 54 is shown comprised of a pair of oppositely polarized plates of Lead-Zirconate-Titanate (PZT) which have been bonded together and have a conductive coating on the exposed major surfaces. Electrical connection to member 54 may conveniently be made through frame member 35 and portion 40 to the lower surface and through spring member 41 to the top surface.

Piezo-electric member 54 may be mounted or clamped in an off-center position for modifying the response characteristics of the transducer assembly. The necessary coaction of portion 102 of spring member 41 and portion 101 of mounting member 40 to securely hold piezoelectric member 54 may be obtained through the use of many modifications which may become apparent to those skilled in the art in carrying out the principles of my invention. For example, portion 101 may be relieved at its center to provide a pair of bearing surfaces at either end which coact with portion 102 to provide a three point clamping assembly.

In one embodiment of my invention, successful operation was observed where the near source of compressional wave energy was approximately one-half inch from the transducer assembly. Satisfactory discrimination between the near source and distant sources was readily obtainable.

It has been observed that the substantially metallic construction shown in this illustrative example, contributes to a desirable freedom from the effects of stray electric, and the like, signals.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. A microphone comprising; a fluid impervious frame member having a pair of apertures in opposing surfaces; a pair of diaphragms disposed and mounted in said apertures and responsive to the impingement of compressional wave energy thereon so as to provide an output motion in accordance with said energy; a bi-morph piezo-electric member of the bender class, of generally elongate configuration and having electrodes on opposite major surfaces thereof; mounting means within said frame member holding said piezo-electric member intermediate the ends thereof; and means connecting one of said diaphragms to one end of said piezo-electric member and the other of said diaphragms to the opposite end thereof, whereby the output of said piezo-electric member is proportional to the difference in relative displacement of said diaphragms.

2. A microphone comprising; a fluid impervious frame member having a pair of apertures in opposing surfaces; a pair of diaphragms disposed and mounted in said apertures and responsive to the impingement of compressional wave energy thereon so as to provide an output motion in accordance with said energy; a bi-morph piezo-electric member of the bender type, of generally elongate configuration and having electrodes on opposite major surfaces thereof; mounting means within said frame member holding said piezo-electric member substantially at its center; and means connecting one of said diaphragms to one end of said piezo-electric member and the other of said diaphragms to the opposite end thereof, whereby the output of said piezo-electric member is proportional to the difference in relative displacement of said diaphragms.

3. A microphone comprising; a fluid impervious frame member having a pair of apertures in opposing surfaces; a pair of diaphragms disposed and mounted in said apertures and responsive to the impingement of compressional wave energy thereon so as to provide an output motion in accordance with said energy; a piezo-electric member of generally elongate configuration and having electrodes on opposite major surfaces thereof; mounting means within said frame member holding said piezo-electric member substantially at its center, said mounting means being adapted to provide a conductive connection to each of the major surfaces on said piezo-electric member; and means connecting one of said diaphragms to one end of said piezo-electric member and the other of said diaphragms to the opposite end thereof, whereby the output of said piezo-electric member is proportional to the difference in relative displacement of said diaphragms.

4. A distant noise cancelling microphone comprising; a pair of diaphragms responsive to the impingement of compressional wave energy thereon so as to provide an output motion in accordance with said energy; a fluid impervious frame member having a pair of apertures and including means mounting said diaphragms in said apertures in back-to-back relationship so as to substantially enclose a volume of fluid in said frame member; a bimorph piezo-electric member of the bender type, of generally elongate configuration and including output terminals therefor; mounting means within said frame member holding said piezo-electric member substantially at its mid-point; and connecting means connecting the outputs of said diaphragms to opposite ends of said piezo-electric member whereby the output of said piezo-electric member is proportional to the instantaneous difference in relative displacement of said diaphragm members.

5. A distant noise cancelling microphone comprising; a pair of diaphragms responsive to the impingement of compressional wave energy thereon so as to provide an output motion in accordance with said energy; a fluid impervious frame member having a pair of apertures and including means mounting said diaphragms in said apertures in back-to-back relationship so as to substantially enclose a volume of fluid in said frame member; an electromechanical member of generally elongate configuration including output terminals therefor; mounting means within said frame member holding said electromechanical member substantially at its mid-point; first connecting means connecting the output of one of said diaphragms to one end of said electromechanical member; second mounting means comprised of material exhibiting compliant characteristics, connecting the other of said diaphragms to the other end of said electromechanical member whereby the output of said electromechanical member is proportional to the instantaneous difference of the ends of said electromechanical member.

6. A distant noise cancelling microphone comprising; a pair of diaphragms responsive to the impingement of compressional wave energy thereon so as to provide an output motion in accordance with said energy; a fluid impervious frame member having a pair of apertures and including means mounting said diaphragm in said apertures in back-to-back relationship so as to substantially enclose a volume of fluid in said frame member, said frame member further including an internal sound impervious partition whereby the enclosed volume of fluid is divided into substantially two equal parts; an electromechanical member of generally elongate configuration including output terminals therefor; mounting means within said frame member holding said electromechanical member substantially at its mid-point; and connecting means connecting the outputs of said diaphragms to opposite ends of said member whereby the output of said electromechanical member is proportional to the instantaneous difference in relative displacement of said diaphragm members.

7. The apparatus of claim 6 in which an acoustical resistance is disposed in the internal partition.

8. A microphone comprising; a fluid impervious frame member having a pair of apertures in opposing surfaces; a pair of diaphragms disposed and mounted in said apertures and responsive to the impingement of compressional wave energy thereon so as to provide an output motion in accordance with said energy; a piezo-electric member of generally elongate configuration and having electrodes on opposite major surfaces thereof; mounting means within said frame member holding said piezo-electric member intermediate the ends thereof; and means connecting one of said diaphragms to one end of said piezo-electric member and the other of said diaphragms to the opposite end thereof, at least one of said means connecting one of said diaphragms to the end of said piezo-electric member being comprised of material exhibiting compliant characteristics, whereby the output of said piezo-electric member is proportional to the difference in displacement of its ends.

9. A microphone comprising; a fluid impervious frame member having a pair of apertures in opposing surfaces; a pair of diaphragms disposed and mounted in said apertures and responsive to the impingement of compressional wave energy thereon so as to provide an output motion in accordance with said energy; a piezo-electric member of generally elongate configuration and having electrodes on opposite major surfaces thereof; mounting means, including a first member having first and second areas of contact with one face of said piezo-electric member and a second member having a single area of contact with piezoelectric member, disposed within said frame member and holding said piezo-electric member substantially at its center; and means connecting one of said diaphragms to one end of said piezo-electric member and the other of said diaphragms to the opposite end thereof, whereby the output of said piezo-electric member is proportional to the difference in relative displacement of said diaphragms.

10. In sound transducing apparatus, the combination comprising; a pair of sound responsive members displaceable in response to impingement of compressional wave energy thereupon; a frame member including means for mounting said sound responsive members on opposed surfaces thereof; a piezo-electric member of elongate shape and having a pair of output terminals; means, including a first member having a pair of areas in engagement with one face of said piezo-electric member and a second member having a single area in engagement with the other face of said piezo-electric member, mounting said piezo-electric member intermediate its ends and within said frame member; and means connecting said sound responsive members to respective ends of said piezoelectric member whereby an electrical signal proportional to the difference in displacement of said sound responsive members is present at said output terminals.

11. A microphone comprising; a fluid impervious frame member having a pair of apertures in opposing surfaces; a pair of diaphragms disposed and mounted in said apertures and responsive to the impingement of compressional wave energy thereon so as to provide an output motion in accordance with said energy; a piezo-electric member of generally elongate configuration and having electrodes on opposite major surfaces thereof; mounting means, including first and second members disposed in clamping engagement on opposite faces of said piezo-electric member, one of said members being in engagement with said piezo-electric member in two areas and the other of said members being in engagement with said piezo-electric member in one area, said mounting means being disposed within said frame member and holding said piezo-electric member intermediate the ends thereof; and means connecting one of said diaphragms to one end of said piezo-electric member and the other of said diaphragms to the opposite end thereof, whereby the output of said piezo-electric member is proportional to the difference in relative displacement of said diaphragms.

12. The apparatus of claim 11 in which the member having a single area of engagement with the piezo-electric member is disposed intermediate the areas of contact of the other of the members with the piezo-electric member.

References Cited by the Examiner
UNITED STATES PATENTS

| | | | |
|---|---|---|---|
| 2,406,119 | 8/1946 | Williams et al. | 179—110 |
| 2,552,878 | 5/1951 | Wiggins | 179—138 |
| 2,553,539 | 5/1951 | Bauer | 179—1 |
| 2,773,942 | 12/1956 | Christensen | 179—110 |
| 2,989,597 | 6/1961 | Victoreen | 179—110 |
| 3,002,179 | 9/1961 | Kuester | 179—110 |
| 3,025,359 | 3/1962 | Schilling et al. | 179—110 |

ROBERT H. ROSE, *Primary Examiner.*

H. W. GARNER, F. N. CARTEN, *Assistant Examiners.*